United States Patent [19]
Horvath et al.

[11] 4,327,244
[45] Apr. 27, 1982

[54] SUPERCONDUCTIVE CABLE

[75] Inventors: Imre Horvath, Rümlang; Kurt Kwasnitza, Glattbrugg, both of Switzerland

[73] Assignee: BBC Brown, Boveri & Company, Limited, Baden, Switzerland

[21] Appl. No.: 117,634

[22] Filed: Feb. 1, 1980

[30] Foreign Application Priority Data

Feb. 9, 1979 [CH] Switzerland ............... 1279/79

[51] Int. Cl.³ ............... H01B 12/00; H01B 7/34
[52] U.S. Cl. ............... 174/15 S; 174/126 S; 174/128 S; 29/599
[58] Field of Search ............ 174/15 R, 15 CA, 15 S, 174/15 C, 126 S, 128 S, 120 SC, 128 BL; 29/599; 148/11.5 R

[56] References Cited
U.S. PATENT DOCUMENTS

| | | | |
|---|---|---|---|
| 3,277,564 | 10/1966 | Webber et al. | 174/128 S |
| 3,639,672 | 2/1972 | Kafka | 174/128 S X |
| 3,643,001 | 2/1972 | Schaetti | 174/15 C |
| 3,657,466 | 4/1972 | Woolcock et al. | 174/15 C |
| 3,800,062 | 3/1974 | Kataoka et al. | 174/15 S |
| 3,910,802 | 10/1975 | Wong | 174/128 S X |
| 4,079,187 | 3/1978 | Fillunger et al. | 174/15 S |
| 4,084,989 | 4/1978 | Meyer | 174/128 S X |
| 4,169,964 | 10/1979 | Horvath et al. | 174/15 S |
| 4,176,238 | 11/1979 | Valis et al. | 174/15 S |
| 4,254,299 | 3/1981 | Horvath et al. | 174/15 S |

FOREIGN PATENT DOCUMENTS 2602728  6/1977  Fed. Rep. of Germany .... 174/15 S

*Primary Examiner*—Volodymyr Y. Mayewsky
*Attorney, Agent, or Firm*—Oblon, Fisher, Spivak, McClelland & Maier

[57] ABSTRACT

Superconductive cables are disclosed including wires containing filaments of a superconductive material embedded in a matrix material which is normally conductive at low temperature. Undesirable inductive currents are created within the matrix material which partially flow along the filaments due to flucuations or changes in the magnetic field or due to variations in an external magnetic field. In order to suppress such undesirable currents and the losses connected therewith, the wires are twisted and cabled to form twisted strands of wires. The strands of wires are additionally twisted or entwined into bundles of twisted wire strands. This additional measure permits a systematic transposition of the wires and thus a suppression of the interference currents heretofore unattainable. In a preferred embodiment of the disclosed superconductive cable, the conductor wire strands are twisted or entwined with cooling pipes which permit an even cooling of the cable across its entire cross section.

14 Claims, 12 Drawing Figures

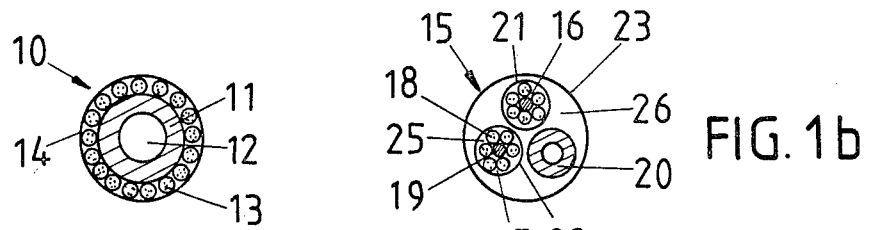
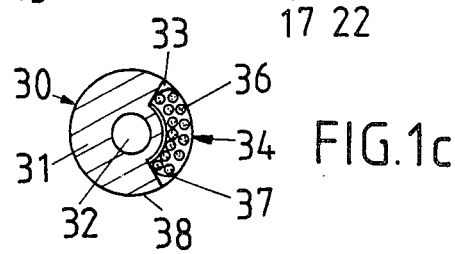
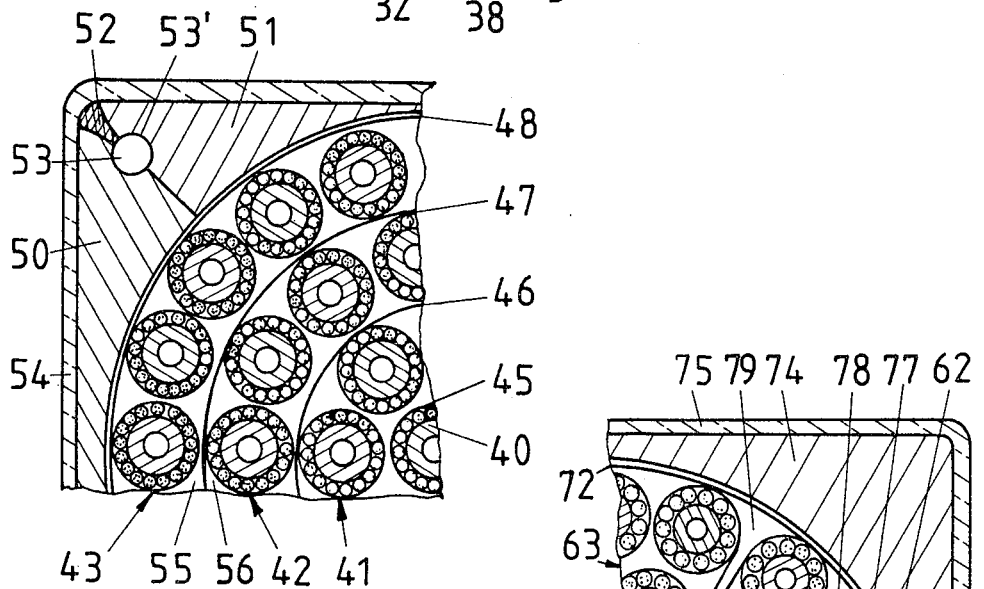
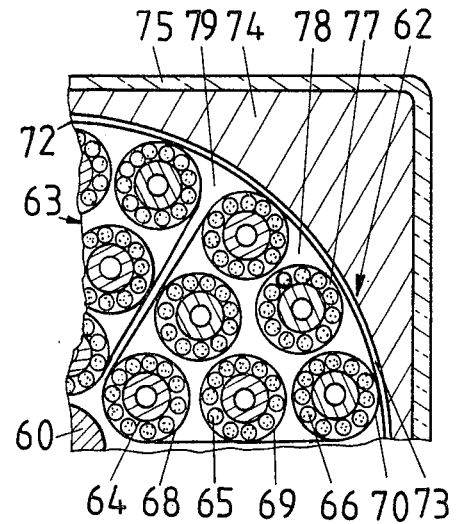
FIG.1a
FIG.1b
FIG.1c
FIG.2
FIG.3

SUPERCONDUCTIVE CABLE

BACKGROUND OF THE INVENTION

1. Field of the Invention

The present invention relates to a superconductive cable containing several wire strands sheathed by a highly resistive, non-magnetic, thermally conductive material. Each wire strand consists of a plurality of twisted wires with each wire containing a plurality of filaments of a superconductive material embedded in a matrix material.

2. Description of the Prior Art

The structure of a superconductive cable made of wires containing very thin filaments of a superconductive material embedded in a matrix material is advantageous because wires of this kind have relatively minor magnetic instabilities and low magnetic losses in the filaments. However, this advantage is countered by a disadvantage in that the magnetic fields created by the filaments whenever the current is switched on and by any other time-variable, changing magnetic fields, act to induce eddy currents in the normally conductive matrix material even at extremely low temperatures. These induced currents partially flow within the superconductive filaments and, for this reason, are very slow to disappear.

In order to prevent, as far as possible, induced currents within the matrix material, two measures have been used up to now. The wire is twisted around its longitudinal axis and several wires are either formed into a strand or interlaced to form a ribbon. In addition, each wire and each stranded wire are sheathed by a material having a high resistance. This high resistance material must not be magnetic and should have good thermal conductivity such that the magnetic field created by the current in the superconductive filaments is not impeded and the heat created in the wires may be carried away easily.

The described disadvantage is magnified further whenever the superconductive cable is used in the construction of a very powerful electro-magnet, which will come under the influence of another highly powerful periodically varying magnetic field, as, for instance, in certain plants destined for use with nuclear fusion.

SUMMARY OF THE INVENTION

Accordingly, one object of the present invention is to provide a novel superconductive cable for use with very high level currents in which the losses caused by induced currents are low, and which permits maximum cooling of the entire cross section of the cable.

The present invention achieves this objective for a cable of the initially described type, whose wire strands are twisted or interlaced to form stranded wire bundles, which divide the cross section of the cable in a circular or a sectoral direction, and whereby each bundle of stranded wires has a sheath made of a high resistance, non-magnetic, heat-conductive material.

One preferred embodiment of the novel cable of the present invention has its cross-section divided in a circular manner by the stranded wire bundles and contains twisted wires in many steps which makes it possible to reduce the losses by induced currents to an extent heretofore not possible. In addition, the wires of each strand are preferably twisted about a coolant channel which makes it possible to achieve an even temperature across the entire cable cross section, even in cables with large cross sections.

Other preferred embodiments of the cable of the present invention have the cross section of the cable divided in segments by the stranded wire bundles, each equally containing multistage twisted wires and, optionally, twisted or interlaced wire strands. It is this last embodiment in particular which makes it possible, to completely and systematically transpose the wires, or the wire strands, respectively, within a bundle of stranded wires, i.e., to regularly interchange the inner and outer wires, or wire strands, respectively, along the length of the cable, which suppresses the losses by induced currents still more effectively than a multiple twisting according to another embodiment. Preferably, in this other embodiment also, the wires are twisted about a coolant channel, or else at least one coolant channel is provided for each bundle of wire strands.

In both of these embodiments, the space between the wires and/or strands of wires and/or bundles of strands of wires may be filled by solder, or these spaces may be used as additional channels for a coolant, which permits a particularly effective multiple current cooling.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1a through 1c are cross-sections through various wire strands containing several twisted or interlaced wires according to the present invention;

FIG. 2 shows part of a cross-section through a cable according to the present invention, the wire strands of which divide the cross-section in a circular arrangement;

FIG. 3 shows part of a cross-section through a cable according to the present invention, the wire strands of which divide the cross-section in segments.

DESCRIPTION OF THE PREFERRED EMBODIMENTS

Figure 4A:
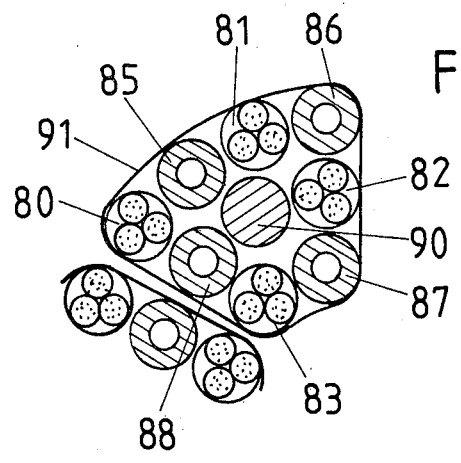
FIGS. 4a through 4g show sections of various embodiments of wire strand bundles which are suitable for the construction of a cable of the present invention as shown in FIG. 3.

Referring now to the drawings, wherein like reference numerals designate identical or corresponding parts throughout the several views, and more particularly to FIG. 1a thereeof, a cross section of a symetrically stranded wire 10 according to a first embodiment of the present invention is shown. The wire strand comprises a copper pipe 11 having a bore 12 provided as conduit pipe or as a channel for the coolant. Around this pipe and adjacent thereto several wires 13 are twisted. Each of these wires consists of a matrix material embedded with a plurality of very thin filaments made of a superconductive material. Each wire is twisted about its own axis. In addition, wire strand 10 is provided with a sheathing 14 consisting of a foil of a highly electrically resistive, non-magnetic, thermally conductive material which surrounds the wires. The free space between the wires 13, the outer wall of the pipe 11, and the inside wall of the sheathing 14 respectively, may be filled with solder or it may be utilized as an additional flow-channel for the coolant.

In a practically tested embodiment of the wire strand as shown in FIG. 1a, the outside diameter of the copper pipe is 2 mm and its inner diameter is 1.2 mm. Each wire contains 66 filaments made of NbTi superconductive material embedded in a matrix of Cu-CuNi. The diameter of each filament is $30\mu$ and the diameter of the entire wire is 0.4 mm. The sheathing is made of a non-magnetic CuNi foil having an electrical resistivity of approximately $3 \times 10^{-7}$ OHM-meter. The foil may be wrapped around the strand of wires like a ribbon with the edges abutting or overlapping. It is possible to use thin wire in place of the foil. A soldering material of PbSn with an electrical resistivity of about $10^{-8}$ OHM-meter may be used to fill out the interstices.

FIG. 1b is a cross-section of a second embodiment of the present invention showing a wire strand 15 having an asymetrical cross section. The wire strand contains two bundles of stranded wires 16, 17, each containing a plurality of wires 18 which are twisted about a central wire 19. Both of these bundles are twisted with a copper pipe 20, the latter being used as coolant channel. Each bundle of stranded wires has a sheathing 21, 22, respectively. Wire strand 15 is formed by the two wire bundles and the copper pipe, and is enclosed by a sheath 23.

In the wire strand as shown, the copper pipe 20 may be replaced by a suitable copper wire to serve for the stabilization of the wire strand. The spaces 25, 26, between the wires and their sheathings, or between the wire bundles and the sheathings of the strands, respectively, may be filled with solder or may be utilized as additional flow channels for the coolant.

FIG. 1c is a cross section of a third embodiment of the present invention showing an asymetrically designed stranded wire 30. This wire strand consists of a thick-walled copper pipe 31, the bore 32 of which is being used as channel for the coolant. The wall of the pipe has a recess 33, in the shape of an annular segment, into which a ribbon 34 of at least two layers of interlaced wires 36 has been inserted. A sheathing 37 is placed around the ribbon 34, made of interlaced wires, and an additional sheathing 38 is placed around the entire wire strand. Both sheaths consist of highly resistive material.

The wire strands shown in FIGS. 1a through 1c are advantageous in that the coolant flows through the cable in the immediate proximity of the wires containing the superconductive filaments, while the coolant channel, which is formed by the copper pipe, offers only minor flow resistance. This affords good stabilization against thermic interferences, a good utilization of the specific heat of the coolant, and a relatively negligible pressure drop of the coolant within the channels. These advantages are particularly evident whenever supercritical helium is used as a coolant.

It is to be understood that the wires, bundles of wires, coolant channels, and stabilizing wires may be formed into strands other than as shown. It is also to be understood that wires, filaments, and coolant channels may have dimensions other than those described for the above embodiments, and that materials other than those mentioned above may be utilized.

FIG. 2 is a partial cross-section through a cable where the stranded wire bundles are positioned to divide the cross section in an annular arrangement. The cable contains a center strand 40 about which is twisted a first bundle of strands 41. A second bundle of stranded wires 42 is twisted around the first stranded wire bundle 41, and a third bundle of wires 43 is twisted around the former. The center strand 40 and each of the three bundles of stranded wires are provided with sheaths 45, 46, 47 and 48, respectively, consisting of a highly resistive material. The wire strands are enclosed in a two-part steel sleeve 50, 51. The two parts of this sleeve are welded together along a welding seam 52. It is to be understood that the sleeve has a second welding seam, which is not shown, located at 180° from the seam 52. Each of the two parts of the sleeve has a recess 53, 53' in the area of the proposed welding seam. The recesses together form a coolant channel. This channel is fed a coolant during the welding of the two sleeve parts, in order to prevent inadmissible heating of the bundle of wire strands, or of the strands of wires or wires, respectively. The steel sleeve provides effective protection for the bundles of stranded wires and the wire strands from mechanical damage and it absorbs all tensile stresses affecting the cable, in particular in the longitudinal direction. Finally, the steel sleeve is surrounded by an insulating layer 54, preferably consisting of plastic foils and fiber glass ribbons.

In the cable as shown in FIG. 2, each wire strand is provided with a coolant channel which permits the maintaining of a relatively uniform temperature across the entire cross section of the cable. The empty space between the wires of each wire strand and between the strands of each bundle of wire strands, as, for instance, the spaces 55, 56, may be filled with solder or may be utilized as coolant channels. The latter procedure permits a very effective multiple current cooling with a very minor flow resistance to the coolant.

The bundles of wire strands in this embodiment consist of wire strands positioned in an annular arrangement and twisted about the axis of the annulus. This embodiment has an advantage in that it may be relatively easily manufactured. On the other hand, this embodiment does not permit a transposition of the individual wire strands, i.e., an exchange of the wire strands running close to the axis with those running along the rim of the cable in the longitudinal direction, to most effectively suppress the induction currents within the cable. Cables of the type as shown in FIG. 2, therefore, preferably are used for the windings of magnets with constant energizing current or for such applications where they are not exposed to an outside magnetic field.

FIG. 3 is a partial cross section of a cable in which the bundles of wire strands divide the cross section of the cable in segments. A steel rope 60 is arranged in the center of the cable thereby markedly increasing the tensile strength of the cable. Twisted around this steel rope are several bundles of stranded wires 62, 63, each having cross sections in the shape of a sector of a circle. Each bundle of stranded wires contains several stranded wires 64, 65, 66, etc., with each wire being provided with a sheathing 68, 69, 70 of a highly resistive, heat-conductive material. The strands within the bundle of wire strands are twisted about each other so that they continually change their position within the bundle cross section along the length of the cable, whereby a systematic and complete transposition is achieved. As has been noted at the outset, this transportation affords optimum suppression of undesirable induction currents. Wire strand bundles of this type having transposed strands of wires, therefore, are particularly well suited for cables intended for the windings of magnets with periodically changing energizing currents, or for cables, respectively, which are under the influence of a changing magnetic field.

Each stranded wire bundle is enclosed in a sheathing 72, 73 of a highly resistive, good heat conducting material. The bundles of stranded wires, as in the embodiment according to FIG. 2, are welded into a steel sleeve 74, which is surrounded by an insulating layer 75.

The empty spaces, for instance, the free spaces 77, 78, 79 between the wires of each strand, between the strands, and between the bundles of wire strands, may be filled with solder, or may be used as additional cooling channels.

In the following discussion, various embodiments of the present invention having stranded wire bundles are described, which divide the cross section of the cable in sectors and which may be used for the design of a cable of the type shown in FIG. 3. FIG. 4a shows a cross section through a bundle of wire strands intended for twisting about a central bundle of coolant channels (not shown). This bundle of stranded wires contains wire strands 80, 81, 82, 83, each of which are designed similarly to the wire strand shown in FIG. 1b. The bundle of wire strands only contains stranded wire bundles and interspersed copper pipes 85, 86, 87, 88, all of which are twisted around a copper wire 90. Each bundle of wires, each strand of wires, and each bundle of wire strands has a sheathing made of highly resistive, heat-conductive material. Only the sheathing 91 of the bundle of wire strands is designated.

Figure 4B:
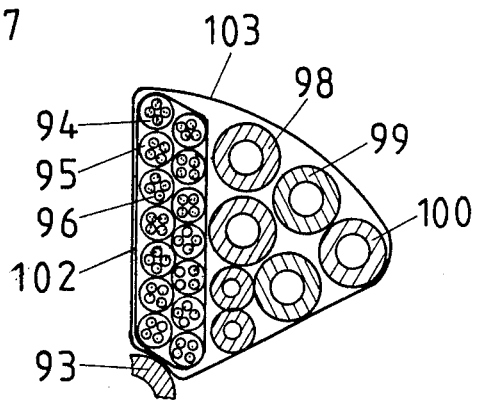

FIG. 4b shows a cross section through a bundle of wire strands intended to be twisted about a single copper pipe 93. This bundle of wire strands contains several wire strands 94, 95, 96, etc. which are entwinded in two layers. In addition, this bundle of wire strands contains a plurality of copper pipes 98, 99, 100, etc. The entwined wire strands and the copper pipes are arranged next to each other within the bundle of wire strands, whereby the entwinded wire strands are arranged along one longitudinal side and the copper pipes are arranged within the remaining space which is enclosed by a highly resistive, heat-conductive sheathing 102, 103.

Figure 4C:
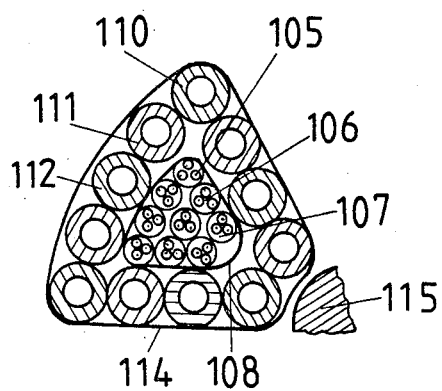

FIG. 4c shows a cross section through a bundle of wire strands whose wire strands 105, 106, 107, etc., are twisted or entwined with each other and which are enclosed by a sheathing 108. A single layer of copper pipes 110, 111, 112, etc. is placed around these sheathed wire strands and the layer of pipes is enclosed in a sheathing 114. For the manufacture of a cable, the bundles of wire strands are twisted about a steel wire 115.

Figure 4D:
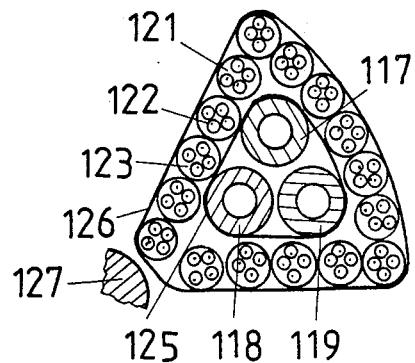

FIG. 4d shows a cross section through a bundle of wire strands in a complementary design to the bundle of wire strands shown in FIG. 4c. This bundle of wire strands contains a core formed by several copper pipes 117, 118, 119, about which is an arrangement of twisted wire strands 121, 122, 123. The coolant pipes and the wire strands are each wrapped by a sheathing 125, 126, respectively, made from a highly resistive, heat-conductive material. This bundle of wire strands also is intended to be twisted about a steel wire 127.

Figure 4E:
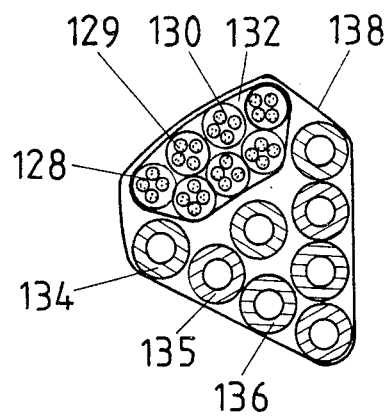

FIG. 4e shows a cross section through a bundle of wire strands in which the individual wire strands 128, 129, 130, etc., are twisted or entwined with each other and which are arranged along the outer circumference of the bundle of wire strands. The wire strands are enclosed by a highly resistive, heat-conductive sheathing 132. Copper pipes 134, 135, 136, etc. are arranged in the remaining area of the bundle of stranded wires. The wire strands and the pertinent copper pipes are enclosed in an additional highly resistive, heat-conductive sheathing 138.

Figure 4F:
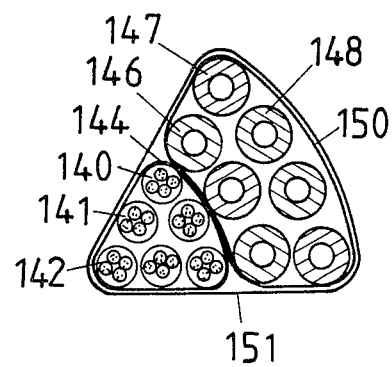

FIG. 4f shows a cross section through a bundle of wire strands, which is practically a complementary design of the embodiment shown in FIG. 4e. In this bundle of wire strands, the wire strands 140, 141, 142, etc. are arranged in that part of the bundle which adjoins the cable axis in the assembled cable. The wire strands are surrounded by a highly resistive, heat-conductive sheathing 144. The coolant channels 146, 147, 148, etc. are arranged in the area of the outer circumference of this bundle of wires strands and are also enclosed in a sheathing 150. A third sheathing 151 encloses the entire bundle of wire strands.

Figure 4G:
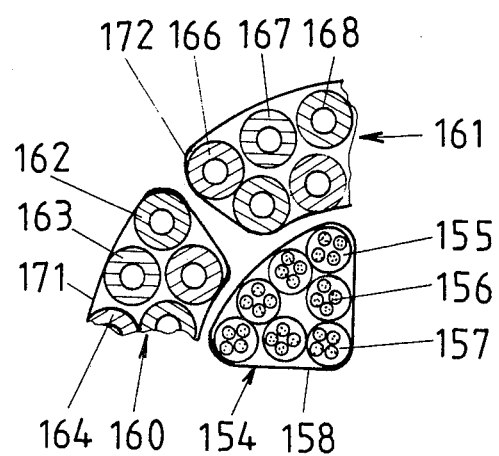

Finally, in FIG. 4g, a cross section through a bundle of wire strands 154 is shown, which, in contrast to the embodiments shown in FIG. 4a through 4f, has no common sheathing for the wire strands and the coolant channels. The wire strands 155, 156, 157. etc., are twisted or entwined and are arranged in a sheathing 158 of highly resistive, heat conductive material. The bundle of wire strands is encased in copper pipes 162, 163, 164, etc., and 166, 167, 168, etc., which are combined in groups 160, 161. Each group of copper pipes also has a highly resistant, heat-conductive material sheathing 171, 172. The bundle of wire strands is twisted about the center of the cable, as in the embodiments shown in FIGS. 4a through 4f. The groups of copper pipes may or may not be twisted, depending on choice. The lateral limits of the groups of copper pipes is displaced against the lateral limits of the bundle of stranded wires.

It is to be understood that the examples of the embodiments shown of the conductive strands, the bundles of wire strands, and the superconductive cable may be adapted to definite practical requirements. Thus, for instance, the core of the cable may consist of coolant channels, in order to achieve particularly effective cooling, or may be made of massive or twisted material which is normally conductive electrically at low temperatures, in order to stabilize the cable. Also, the core may be made of a steel wire or a steel rope, respectively, in order to increase the tensile strength of the cable. For additional stabilization, additional copper wires may be inserted into the bundles of wire strands. The channels for the coolant need not be made of copper, but may be manufactured from an easily heat conductive material, as, for instance, from aluminum. Neither it is necessary that these pipes have a circular cross-section. In addition, for the same cables, coolant channels with diverse dimensions may be used. The embodiments shown of the bundles of wire strands may be designed containing any one of the stranded wires as shown in FIGS. 1a through 1c, or other types of wire strands which are not shown. It is further possible, to use types of stranded wires of different construction in one and the same bundle. In all of the embodiments, the space between the wires within the strand, between the wire strands in the wire strand bundles, and between the wire strand bundles may be filled with solder or may be utilized as an additional coolant channel. In order to improve the flow of the coolant, it is quite possible to use coolant channels with perforations, thus making possible an exchange of coolant between the free spaces between the wires, the wire strands, the bundles of wire strands, and the coolant channel. Finally, it is possible to design a cable with a new arrangement of bundles of wire strands in which these bundles of wire strands do not contain any coolant channels, but where the cable is cooled exclusively by the coolant flowing through the empty spaces between the wires, the wire strands, and the bundles of wire strands.

Obviously, numerous modifications and variations of the present invention are possible in light of the above teachings. It is therefore to be understood that within the scope of the appended claims, the invention may be practices otherwise than as specifically described herein.

What is claimed as new and desired to be secured by Letters Patent of the United States is:

1. An electrical superconductive cable, comprising:
   a plurality of bundles of wire strands, said plurality of bundles of wire strands being disposed such that said cable is divided by said bundles into one of a plurality of concentric annular sections and a plurality of radial sections, each of said plurality of bundles of wire strands including a plurality of wire strands, each of said plurality of wire strands being covered by a sheath, each of said plurality of bundles of wire strands being covered by a sheath, each of said sheaths being formed from a highly electrically resistive, non-magnetic, heat conductive material, each of said plurality of wire strands including a plurality of wires, each of said plurality of wires including a plurality of superconductive filaments embedded in a matrix material;
   housing means for at least partially enclosing said cable; and
   cooling means integral with said cable for cooling said cable.

2. A superconductive cable as recited in claim 1, wherein:
   each of said plurality of bundles of wire strands are twisted about a longitudinal axis passing through the center of said cable.

3. A superconductive cable as recited in claim 2, wherein said cooling means comprises:
   at least one coolant channel arranged along said longitudinal axis of said cable.

4. A superconductive cable as recited in claim 1, wherein said cooling means comprises:
   at least one coolant channel included in each of said plurality of bundles of wire strands.

5. A superconductive cable as recited in claim 4, wherein:
   each of said wire strands includes a first space defined by said sheath covering said wire strand and said wires included in said wire strand;
   each of said bundles of wire strands includes a second space defined by said wire strands included in said bundle, said sheath covering said bundle, and said at least one coolant channel included in said bundle; and
   wherein said first and said second spaces act as additional coolant channels, said additional coolant channels being used for double-flow cooling.

6. A superconductive cable as recited in claim 1, wherein:
   said plurality of bundles are arranged such that the cross section of said cable is divided into a plurality of radial sections, each section having essentially radial sidewalls, said cooling means including a plurality of coolant channels arranged in annular multi-layered groups with each group being covered by a sheath of highly electrically resistive, non-magnetic, heat conductive material, said annular groups being arranged in a ring adjacent to a portion of the outer periphery of said plurality of radial sections and concentric with the center of said cable, said annular groups being positioned with respect to said radial sections such that adjacent groups adjoin each other at positions displaced from said essentially radial sidewalls of said sections.

7. A superconductive cable as recited in claim 4, wherein:
   said plurality of bundles are arranged such that said cross section of said cable is divided into a plurality of radial sections, each radial section being defined by a bundle, each bundle including a plurality of wire strands twisted together and grouped in at least two layers along a radial wall of each radial sector, said cooling means further including a plurality of coolant channels disposed adjacent to said two layers of wire strands.

8. A superconductive cable as recited in claim 4, wherein:
   each of said plurality of bundles of wire strands further includes a plurality of coolant channels positioned adjacent to each other, said wire strands forming each of said bundles being arranged in a single layer twisted about said plurality of coolant channels, said sheathing covering each of said bundles being positioned adjacent to said single layer of wire strands.

9. A superconductive cable as recited in claim 4, wherein:
   each of said plurality of wire strands included in each of said bundles are twisted together, said twisted plurality of wire strands being surrounded by a single layer of coolant channels, said sheathing covering each of said bundles being positioned adjacent to said single layer of coolant channels.

10. A superconductive cable as recited in claim 4, wherein:
    said plurality of bundles are arranged such that said cross section of said cable is divided into a plurality of radial sections, each radial section being defined by a bundle, said plurality of wire strands included in each of said bundles being twisted about each other, said plurality of twisted wire strands being located within each bundle at a position adjacent to a longitudinal axis passing through the center of said cable, each of said bundles further including a plurality of coolant channels grouped together and located within each bundle at a position farthest from said longitudinal axis.

11. A superconductive cable as recited in claim 4, wherein:
    said plurality of bundles are arranged such that said cross section of said cable is divided into a plurality of radial sections, each radial section being defined by a bundle, each of said bundles further including a plurality of coolant channels, said coolant channels being grouped together and located within each bundle at a position adjacent to a longitudinal axis passing through the center of said cable, said plurality of wire strands included in each of said bundles being twisted about each other, said plurality of twisted wire strands being located within each bundle at a position farthest from said longitudinal axis.

12. A superconductive cable as recited in claim 1, wherein said cooling means comprises:
    a coolant channel included in each of said plurality of wire strands, said wires forming each of said plurality of wire strands being arranged in a single layer twisted about said coolant channel.

13. A superconductive cable as recited in claim 1, wherein said cooling means comprises:
   a coolant channel included in each of said plurality of wire strands, said wires forming each of said plurality of wire strands being arranged into two equal sized groups, said two groups of wires being twisted with said coolant channel.

14. A superconductive cable as recited in claim 4, wherein said cooling means further comprises:
   a plurality of coolant channels included in each of said plurality of bundles of wire strands, said plurality of coolant channels being twisted together with said wire strands included in each bundle.

* * * * *